(12) United States Patent
Laughlin (10) Patent No.: US 7,941,750 B2
(45) Date of Patent: May 10, 2011

(54) METHOD AND SYSTEM FOR DEFINING SEPARATE PRINT QUALITY REGIONS WITHIN A PRINT JOB (75) Inventor: John David Laughlin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1953 days.

(21) Appl. No.: 09/976,302

(22) Filed: Oct. 11, 2001

(65) Prior Publication Data
US 2004/0205640 A1 Oct. 14, 2004

(51) Int. Cl.
G06F 17/21 (2006.01)
G06F 17/22 (2006.01)
(52) U.S. Cl. ........................... 715/274; 358/3.02
(58) Field of Classification Search .............. 715/526, 715/517, 274; 358/3.02; 707/527
See application file for complete search history.

(56) References Cited

U.S. PATENT DOCUMENTS

| | | | | |
|---|---|---|---|---|
| 4,241,415 A * | 12/1980 | Masaki et al. | | 345/626 |
| 4,837,635 A * | 6/1989 | Santos | | 358/401 |
| 5,512,923 A * | 4/1996 | Bauman | | 347/15 |
| 5,579,446 A * | 11/1996 | Naik et al. | | 358/1.9 |
| 5,704,021 A * | 12/1997 | Smith et al. | | 358/1.9 |
| 5,767,978 A * | 6/1998 | Revankar et al. | | 358/296 |
| 5,859,955 A * | 1/1999 | Wang | | 358/1.9 |
| 5,907,666 A * | 5/1999 | Yano et al. | | 358/1.9 |
| 6,017,113 A * | 1/2000 | Nicoloff et al. | | 347/40 |
| 6,236,462 B1 * | 5/2001 | Terasaka | | 358/1.13 |
| 6,388,757 B1 * | 5/2002 | Koga | | 358/1.11 |
| 6,466,302 B1 * | 10/2002 | Rousseau et al. | | 355/61 |
| 6,559,968 B1 * | 5/2003 | Keronen | | 358/1.18 |
| 6,661,531 B1 * | 12/2003 | Murphy et al. | | 358/1.15 |
| 6,665,841 B1 * | 12/2003 | Mahoney et al. | | 715/520 |
| 6,753,976 B1 * | 6/2004 | Torpey et al. | | 358/1.9 |
| 7,110,152 B2 * | 9/2006 | Johnston et al. | | 358/538 |

(Continued)

OTHER PUBLICATIONS

Kamasak et al., "Dynamic Print Mode Control for Inkjet Printing", International Conference on Digital Printing Technologies, Sep. 30-Oct. 5, 2001, pp. 1-22.*
Srihari, Sargur; "Document Image Understanding"; IEEE; 1986; pp. 87-96.*

(Continued)

Primary Examiner — Doug Hutton
Assistant Examiner — James J Debrow (57) ABSTRACT A user defines regions within each page of a print job and independently specifies a desired print quality setting for each such region. The printer driver running on the host computer that will submit the print job to a printer or printing device has a user interface through which a representation of the print job is displayed for the user. Using the user input device of the host computer, the user can then define or specify multiple elements or regions within each page of the print job. The user can then further set a desired print quality for each of the specified elements or regions. In this way, those elements of a print job that require a high print quality for a satisfactory appearance, such as photographs, can be identified and printed an appropriate quality levels, while other elements, such as text, that do not require a high print quality for a satisfactory appearance can be printed at a lesser print quality level. Alternatively, the printer driver can be set to automatically identify elements of a print job, such a photographs or other graphics, which typically require a high print quality setting for a satisfactory appearance. The printer driver may then automatically specify a higher print quality for those identified elements than is used for the other, less demanding elements of the print job.

20 Claims, 7 Drawing Sheets

U.S. PATENT DOCUMENTS

2002/0067502 A1* 6/2002 Hansen .................. 358/1.15
2004/0003342 A1* 1/2004 Keane et al. .................. 715/500

OTHER PUBLICATIONS

Duong et al, "Extraction of Text Areas in Printed Document Images", 2001, DocEng 01, pp. 157-164.*

Simske et al., "User-Directed Analysis of Scanned Images", ACM, 2003, pp. 212-221.*

Wright, F.D., "Requirments and Design Goals for an Internet printing Protocol", ACM, 1998, pp. 172-179.*

Radun et al., "Content and Quality: Interpretation-Based Estimation of Image Quality", ACM, 2008, pp. 1-15.*

* cited by examiner

METHOD AND SYSTEM FOR DEFINING SEPARATE PRINT QUALITY REGIONS WITHIN A PRINT JOB

FIELD OF THE INVENTION

The present invention relates to the field of document printing based on a print job submitted to a printer or printing device from a computer or computer system. More specifically, the present invention relates to the process of generating a print job with an application on a host computer, specifying characteristics of that print job using a printer driver on the host computer and outputting that print job to a printing device that produces a hard copy rendering of the print job in accordance with the formatting provided by the printer driver. Under the principles of the present invention, a user can define a number of regions within each page of a print job and independently specify a separate print quality setting for each such region.

BACKGROUND OF THE INVENTION

Figure 1:
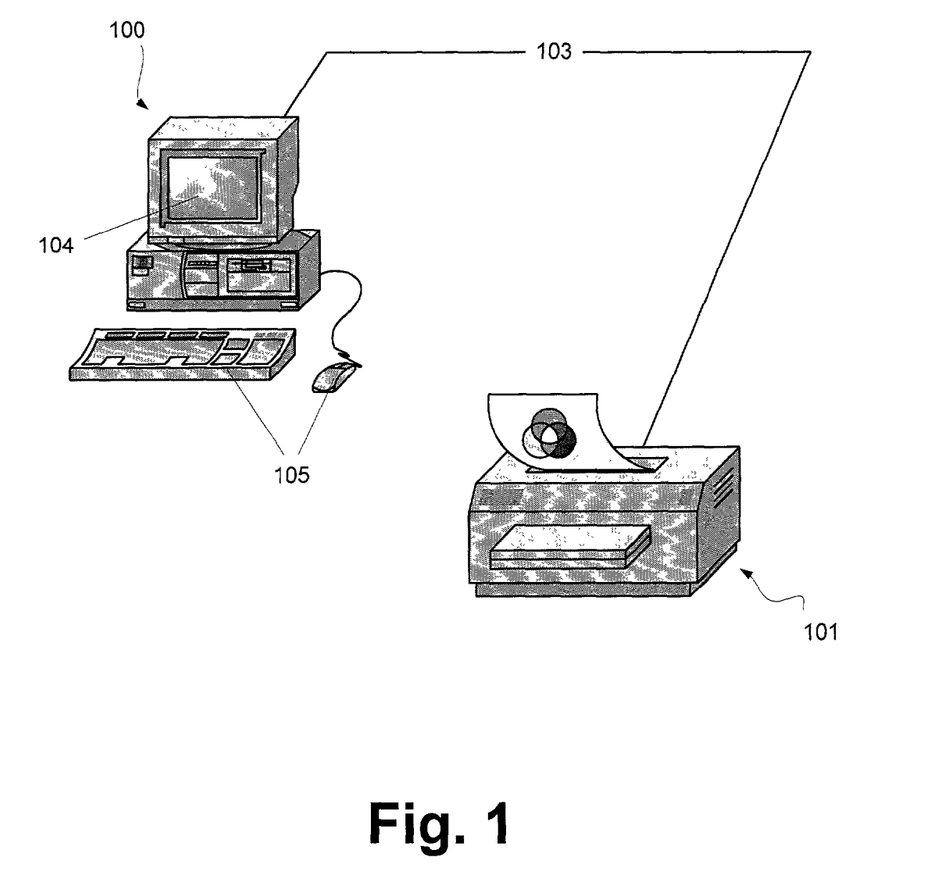
FIG. 1 is an illustration of a basic system including a host computer and a printing device with which the present invention may be practiced.

FIG. 1 illustrates a basic computer system in which a host computer (100) is connected to a printer (101). As is commonly known, the computer (100) can execute a vast variety of different application programs. Most application programs are designed to allow the user of the computer to handle particular tasks. For example, a word processing application provides the user with the tools to draft and edit written documents. A spreadsheet application allows a user to easily produce financial reports. Graphics or Computer Aided Design (CAD) applications allow a user to generate and manipulate pictures, drawings or plans.

The host computer (100) typically includes a monitor (104). The monitor (104) is used to interface with the user by displaying the output of the application the user is working with. User input devices, such as a keyboard and mouse (105) are used to allow the user to input or manipulated data being processed by the application running on the host computer (100). In this way, the user can create the desired result, be it a document, graphic, etc.

Frequently, after a user has generated a document, graphic or other work using the host computer (100), the user will want to generate a hard copy of the work for his or her records or to pass on to someone else for their review. For this purpose, a printer or printing device (101) may be connected to the host computer (100). As user herein, the term "printer" or "printing device" refers broadly to any device that may receive data from a computer or computerized system for the purpose of generating a hard copy rendering of the incoming data.

When the user has completed a work on the host computer (100) that is to be printed, the user typically enters a print command to the application with which the work was generated. The application then calls another program on the host (100) known as a printer driver. The application passes the data of the work to be printed to the printer driver. This data then becomes a print job.

The printer driver formats the data to be received by the printer (101) and rendered by the printer (101) in hard copy form. The printer driver then passes the formatted print job data over a connection (103) to the printer (101). The connection (103) may be a direct serial or parallel connection. Alternatively, the connection (103) may be a network, such as a Local Area Network (LAN), to which both the host computer (100) and the printer (101) are connected.

The printer driver, in addition to formatting the print job for the printer (101), may also allow the user to control some characteristics of the print job. A user interface to the printer driver may be provided on the host computer (100) through which the user can specify, for example, the size of paper on which the print job is printed, whether the print job has a portrait or landscape orientation, whether the print job should be in color or gray scale, etc.

Through the printer driver, the user may also be able to specify the print quality of the print job. For example, if it is important that the resulting hard copy look good, the user may specify a high print quality. This will typically require more toner or ink from the printer (101) and take longer to generate the printed document. However, if it is not important that the print job has a high print quality, the user can specify a lower print quality using the printer driver. In this way, toner will be conserved and the resulting document can typically be printed more quickly.

A problem arises, however, if there are elements in the document that need a high print quality to look satisfactory and other elements that do not. For example, if a document includes both text and photographs, the text may not require a high print quality to be entirely legible and otherwise appear as desired. However, the photographs may not look sharp and satisfactory unless printed with a high print quality. In order to have the photographs appear as desired, the user will have to set the print job to run at a high print quality. The photographs will be satisfactorily printed, as will the accompanying text, but the accompanying text will require more toner and time to print that is necessary for a satisfactory product.

Consequently, there is a need in the art for a system and method that allow a user to generate printed documents in the most toner- and time-efficient manner, even if the print job contains elements that have different print quality requirements for a satisfactory appearance.

SUMMARY OF THE INVENTION

The present invention is directed to a method and system in which a user can, through a printer driver running on a host computer, define regions within a single page of a print job and independently specify a desired print quality setting for each such region. In this way, those elements of a print job that require a high print quality for a satisfactory appearance, such as photographs, can be identified and printed at appropriate quality levels, while other elements, such as text, that do not require a high print quality for a satisfactory appearance can be printed at a lesser print quality level.

In one preferred embodiment, the present invention may be a printer driver stored on a computer-readable medium. The printer driver includes an interface for receiving print job data; and a print job formatting routine which notes one or more regions within a print job derived from the print job data and further specifies a particular print quality level at which each such region is then printed.

The printer driver also preferably includes a "What You See Is What You Get" (WYSIWYG) display routine for generating a WYSIWYG display of the print job;

and a user input routine for receiving user input defining the one or more regions within the print job using the WYSIWYG display. The user input routine receives user input specifying a particular print quality level for each of the one or more regions defined within the print job. The user input routine preferably receives user input through a mouse connected to a host computer on which the printer driver is running.

In an alternative embodiment, the printer driver may include a graphics identification routine for identifying regions of the print job that contain a graphic element. The print job formatting routine may automatically specify a print quality setting for the identified regions of the print job that contain a graphic element. This may be predicated on a user-specified default setting for the print quality level to be applied to the identified regions of the print job that contain a graphic element.

The present invention also encompasses the method inherent in the software and system of the present invention. Specifically, the present invention encompasses a method of printing documents with both controlled print quality and printer efficiency by printing designated regions within the print job at different print quality levels. The designated regions may be within a single page of the print job.

BRIEF DESCRIPTION OF THE DRAWINGS

The accompanying drawings illustrate preferred embodiments of the present invention and are a part of the specification. The drawings are not intended to limit the invention to the embodiments illustrated. Rather, the drawings show preferred embodiment of the present invention as examples of the present invention. Together with the following description, the drawings demonstrate and explain the principles of the present invention.

FIG. 5 illustrates the principles of the present invention applied to the print job illustrated in FIG. 4. FIG. 5 also represents an example of a user interface of a print driver according to the present invention.

Throughout the drawings, identical elements are designated by identical reference numbers.

DETAILED DESCRIPTION OF THE PREFERRED EMBODIMENTS

The present invention is directed to a method and system in which a user can define regions within a single page of a print job and independently specify a desired print quality setting for each such region. The printer driver running on the host computer that will submit the print job to a printer or printing device has a user interface through which a representation of the print job is displayed for the user. Using the user input device of the host computer, the user can then define or specify multiple elements or regions within each page of the print job. The user can then further set a desired print quality for each of the specified elements or regions. In this way, those elements of a print job that require a high print quality for a satisfactory appearance, such as photographs, can be identified and printed an appropriate quality levels, while other elements, such as text, that do not require a high print quality for a satisfactory appearance can be printed at a lesser print quality level.

Alternatively, the printer driver can be set to automatically identify elements of a print job, such a photographs or other graphics, which typically require a high print quality setting for a satisfactory appearance. The printer driver may then automatically specify a higher print quality for those identified elements than is used for the other, less demanding elements of the print job.

Using the drawings, the preferred embodiments of the present invention will now be explained.

Figure 2:
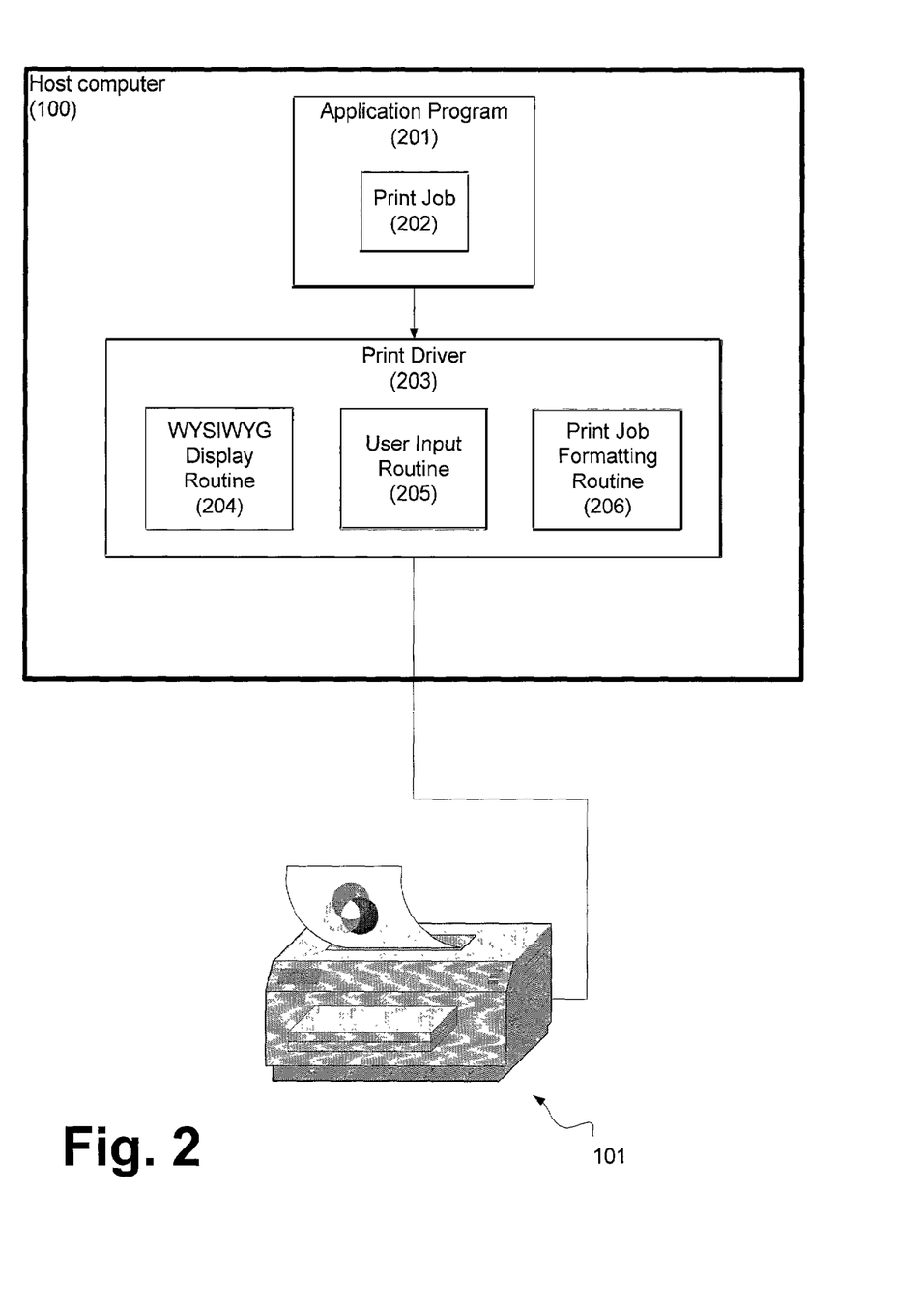
FIG. 2 is an illustration of a first preferred embodiment of a system according to the present invention.

FIG. 2 is an illustration of a first preferred embodiment of a system according to the present invention. As shown in FIG. 2, a host computer (100), with which a user generates a print job, is connected to a printer or printing device (101) that produces a hard copy rendering of the print job.

The host computer (100) may be a general-purpose computer, such as a PC, running one or more application programs. Alternatively, the host computer (100) may be a task-specific computer or computerized system.

As acknowledged above, the connection between the host computer (100) and the printer (101) may be a direct serial or parallel connection, or may be a network (e.g., a local area network) to which both the host computer (100) and the printer (101) are connected. Additionally, the "printer" (101) may be any device that receives data from a computer or computerized system and renders that data as a hard copy document on paper or some other print medium.

In the example of FIG. 2, the host computer (100) is a general-purpose computer that is executing an application program (201). Using the application program (201), the user generates a print job (202). The print job (202) can be, for example, a written document, a picture or graphic, a financial report, etc.

The user provides input or commands to the application program (201) using the user input device or devices of the host computer, e.g., a keyboard and mouse (See FIG. 1). The application program (201) responds accordingly and displays the result on a monitor of the host computer (100) (See FIG. 1). The display of the application program on the monitor and the user input devices constitute a user interface.

At some point, the user may wish to obtain a hard-copy rendering of the data being manipulated with the application program (201). This is typically done by entering a "print" command to the application program (201). The application program (201) then passes the data as a print job (202) to a printer driver (203).

As indicated in FIG. 2, the printer driver (203) is another program running on the host computer (100). The central purpose of the printer driver (203) is to format the data of the print job in a form that can be submitted to and used by the printer (101) to render the desired hard copy of the print job. However, as indicated above, the printer driver (203) may also allow the user to control some aspects of the printing process and characteristics of the resulting print job.

In the first preferred embodiment of the present invention, the printer driver (203) includes a display routine (204). The display routine (204) provides a WYSIWYG illustration of the print job on the monitor (104) of the host computer (100). WYSIWYG stands for What You See Is What You Get. The WYSIWYG illustration is intended to show the user precisely what the print job will look like when printed. If the print job contains multiple pages, the WYSIWYG illustration driven by the routine (204) will preferably allow the user to move between pages of the print job within the WYSIWYG display.

While viewing the WYSIWYG display, or any page thereof, the user can define particular regions on the print job using the WYSIWYG display. The user can then specify separate and independent print quality settings for those defined regions. A user input routine (205) may prompt the user for this input and accepts the input received. As will be described in more detail below, the user can use the user input devices of the host computer (100), particularly a mouse (105) to define print quality regions and set the accompanying print quality level.

After the user has defined print quality regions within the print job and set print quality levels for those regions, a print job formatting routine (206) of the printer driver (203) formats the print job data, including the various print quality settings, for transmission to the printer (101). The print job formatting routine (206) may also apply a default print quality setting to any areas of the print job that are not within a region defined by the user for which a print quality level is specified.

Figure 3:
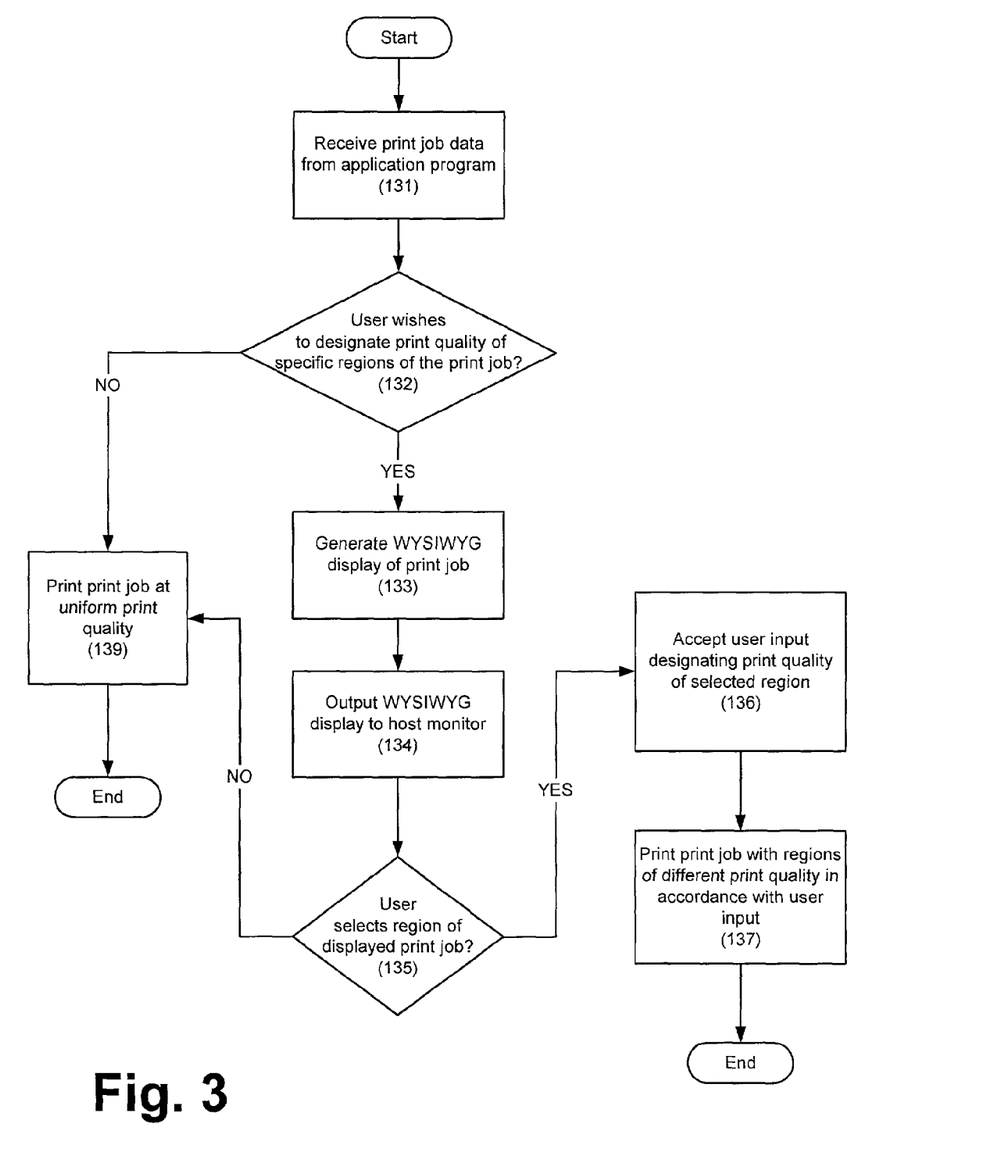
FIG. 3 is a flowchart illustrating a preferred method of operating the system illustrated in FIG. 2 in accordance with the principles of the present invention.

FIG. 3 is a flowchart illustrating a preferred method of operating the system illustrated in FIG. 2 in accordance with the principles of the present invention. As shown in the example of FIG. 3, the process may begin when the print driver receives print job data from an application program to which the user has entered a "print" command (131).

The print driver may then prompt the user as to whether the user wishes to define regions of the print job and designate separate print quality settings for those regions (132). If the user does not wish to define different print quality regions, the print job is submitted to the printer at a uniform print quality setting (139). This uniform print quality setting may be a default setting or entered by the user for the particular print job being run.

If the user does wish to define regions of the print job for separate print quality settings, the system will generate the WYSIWYG display of the print job (133).

This may be done by the WYSIWYG display routine (204) as described above in connection with FIG. 2. The WYSIWYG display is then output to and displayed on the monitor of the host computer (134).

The user then has the opportunity to define regions of the print job using the WYSIWYG display (135) to which separate print quality settings can be applied. If the user fails to define any such regions, the print job is submitted to the printer at a uniform print quality setting (139). As before, this uniform print quality setting may be a default setting or entered by the user for the particular print job being run.

If the user does define regions of the print job on the WYSIWYG display, the process will then accept user input designating the desired print quality setting to be associated with each defined region (136). This may be done by the user input routine (205) as described above in connection with FIG. 2.

After the regions are defined and print quality settings assigned, the print job is formatted accordingly and submitted to the attached printer or printing device. The print job is then printed and rendered in hard-copy form (137). The various regions defined by the user are printed at the print quality level specified for that region by the user. As will be well understood in the art, a higher print quality level typically means that more print data is supplied and more individual pixels are printed in a given distance based on that data for the region or page printed at the higher print quality level.

Figure 4:
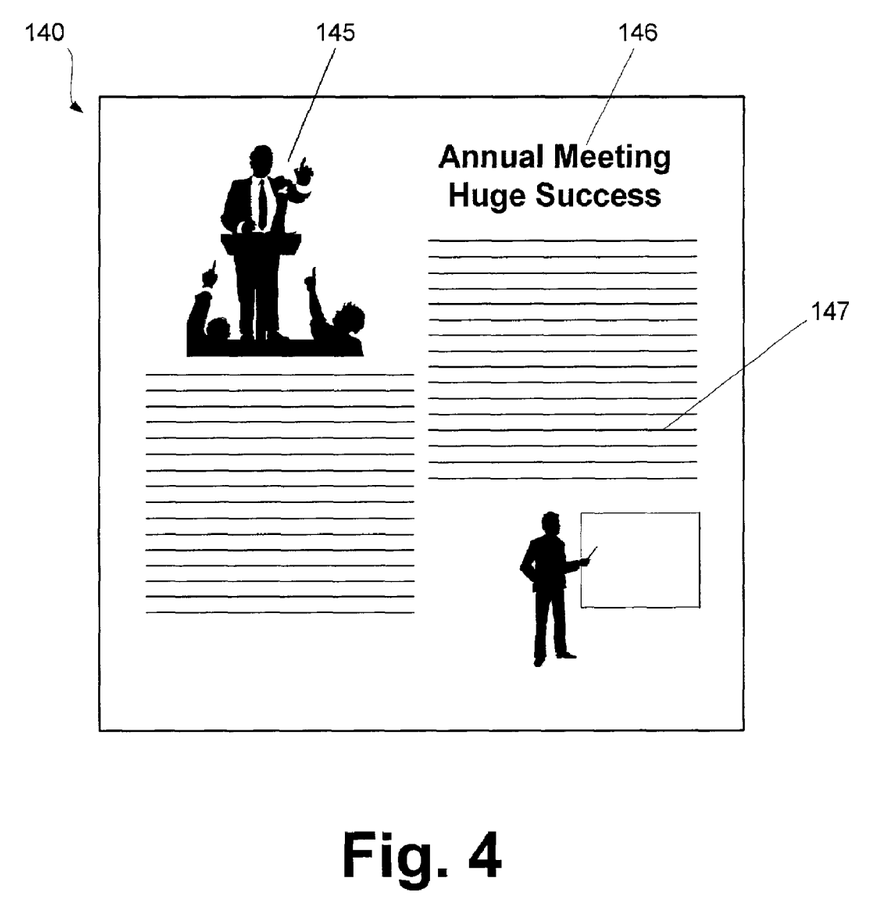
FIG. 4 is an illustration of a page of a print job to which the present invention can be applied.

More of the operation of the preferred embodiment of the present invention, from the perspective of the user, will be now be described using FIGS. 4 and 5. FIG. 4 is an illustration of a page of a print job to which the present invention can be applied. As shown in FIG. 4, an exemplary page of a print job may contain three basic types of elements. These elements are (1) photographs or other graphics (e.g., 145); (2) headlines, headings, mastheads or large-print type (e.g., 146); and (3) blocks of regular-sized text (147). Each of these elements may inherently require a different print quality setting to optimize the trade-off between appearance and economy considerations.

For example, the photographs or other graphics (145) may only have a satisfactory appearance if printed at the highest print quality setting, or at least a relatively high print quality setting. The large-print type (146) will not likely need to be printed at the highest print quality setting to appear as desired, but may need to be printed at a higher print quality setting than smaller text (147). Finally, the regular-sized text (147) is most likely printable at a low or lower print quality setting without unduly sacrificing appearance.

Given these considerations, a user may particularly wish to define a high-quality print region containing the photographic or graphic elements of the print job. An example of this is illustrated in FIG. 5. FIG. 5 illustrates a user working with the WYSIWYG display of FIG. 4 to define a custom print quality region within the print job.

Figure 5:
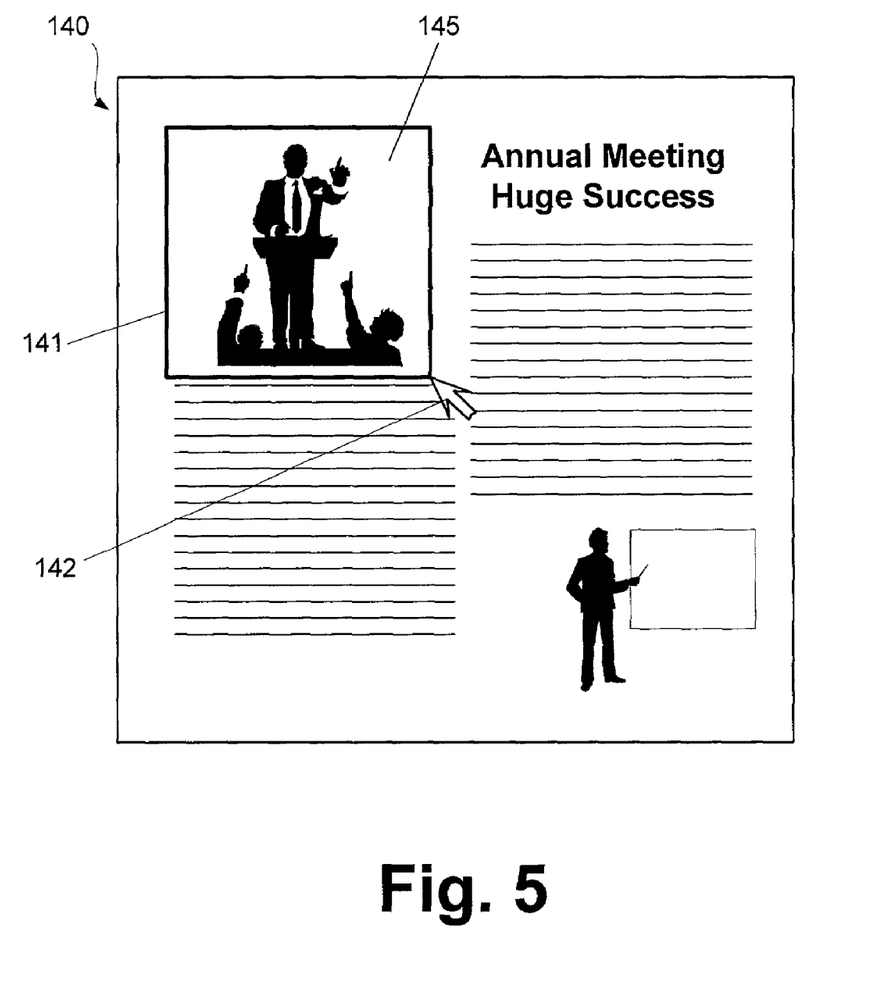

As shown in FIG. 5, the user may be using, for example, a mouse (e.g., 105) to move a cursor (142) on the WYSIWYG display. By clicking and dragging the cursor (142), the user may define a box (141) around an element (e.g., 145) of the print job. In this example, the user presses the left mouse button after positioning the cursor (142) at a corner of the graphic (145). While continuing to depress the left mouse button, the user moves the cursor (142) diagonally across the graphic (145). The user input routine (205; FIG. 2) interprets this input and draws a box (141) around the graphic (145). The box (141) stops expanding when then the user releases the left mouse button. The user can then specify a print quality setting for that portion of the print job within the user-defined box (141).

In the example illustrated in FIG. 5, the user has defined a box (141) around a photographic element of the print job (145). Consequently, the user will likely specify a high or highest print quality setting for the region in the box (141). This process can be repeated for any element or region of the displayed print job with an appropriate print quality setting being identified in connection therewith.

Figure 6:
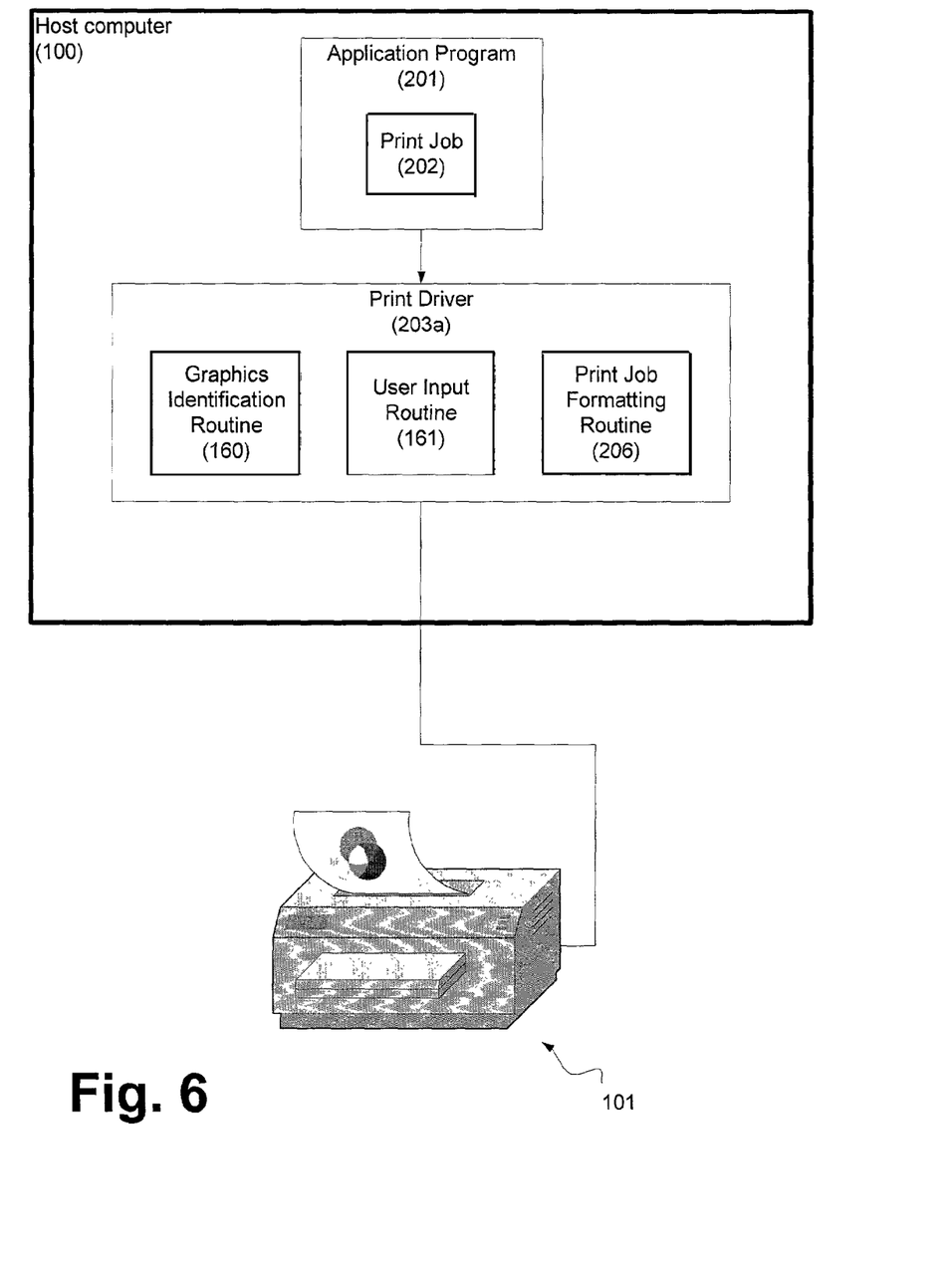
FIG. 6 is an illustration of a second preferred embodiment of the system according to the present invention.

FIG. 6 is an illustration of a second preferred embodiment of the system according to the present invention. The embodiment illustrated in FIG. 6 does not require the user to define regions of the print job which should be printed at specified print quality levels. Rather, the embodiment of FIG. 6 presumes that that print job should be executed at the standard or default print quality setting with only graphic elements of the print job requiring a higher print quality setting. As used here, graphic elements of a print job are any elements are not entirely textual, i.e., have some pictorial or graphic content, including, but not limited to, photographs, clip-art, graphs, and the like.

As shown in FIG. 6, the printer driver (203a) has been modified to omit the WYSIWYG display routine. Rather, the driver (203a) first runs a graphics identification routine (160). This routine (160) will automatically identify all the graphic elements in the print job. The user input routine (161) need not be run for each print job, but can be used to allow the user to activate the graphics identification routine (160) and specify a separate default print quality setting at which the identified graphic elements are to be printed.

The print job formatting routine (206) will then format the print job with print quality settings in accordance with the user-specified settings and the output of the graphics identification routine (160). The formatted print job is then sent to the printer or printing device (101).

Figure 7:
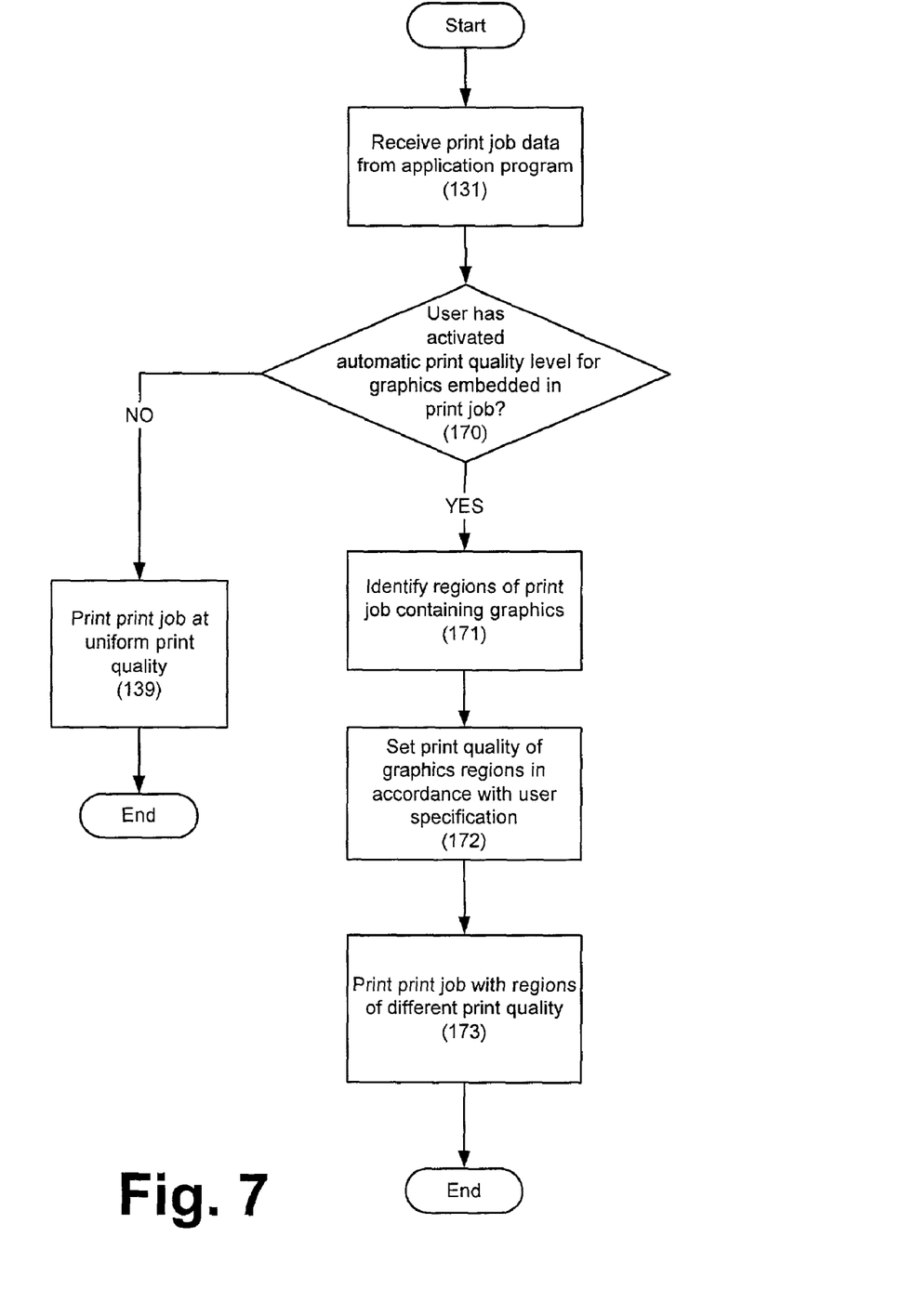
FIG. 7 is a flowchart illustrating a preferred method of operating the system illustrated in FIG. 6 in accordance with the principles of the present invention.

FIG. 7 is a flowchart illustrating a preferred method of operating the system illustrated in FIG. 6 in accordance with the principles of the present invention. As shown in the example of FIG. 7, the process may begin when the print driver receives print job data from an application program to which the user has input a "print command." (131). The print driver will then determine if the user has activated the routines for automatically identifying graphic elements of the print job and increase the print quality setting for those elements (170).

If not, the print driver will submit the print job to the printer, after appropriate formatting, at a uniform print quality setting. The print job is then accordingly printed. (139). However, if the user has activated the routines for automatically identifying graphic elements in the print job, the graphics identification routine (160) will be executed to identify graphic elements in the print job (171).

After the graphic elements of the print job have been identified, the print quality of the regions containing those identified graphic elements will be set. If the user has specified a default print quality setting for identified graphic elements in a print job, the print quality setting can be automatically set accordingly (172). Alternatively, the user input routine (161) may be activated to solicit user print quality settings for all or individual graphic elements in the print job.

When this process is completed, the print job is formatted and sent to the attached printer or printing device. There, the print job is printed with regions of different print quality (173) as specified by the formatting appended by the printer driver.

The preceding description has been presented only to illustrate and describe the invention. It is not intended to be exhaustive or to limit the invention to any precise form disclosed. Many modifications and variations are possible in light of the above teaching.

The present invention also expressly encompasses the computer-readable instructions required to make the host computer and printer or printing device perform in the manner described above. These computer-readable instructions include, but are not limited to, the printer drivers described herein and corresponding software or firmware in the printer or printing device. The flowcharts provided describe, outline and define the structure of the printer driver software that is part of the present invention. These flowcharts and supporting text could be used by a programmer of ordinary skill in the art to practice the printer drivers described. As used herein, the term software or computer-readable instructions means any such instructions regardless of the language in which written or the level at which written (e.g., source code, object code, etc.) without limitation.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A printer driver stored on a non-transitory computer-readable medium comprising:
    an interface configured to receive print job data;
    a print job formatting routine which notes one or more regions within a print job derived from the print job data and further specifies a particular print quality level at which each such region is then printed;
    a WYSIWYG display routine for generating a WYSIWYG display of the print job; and
    a user input routine for receiving user input defining the one or more regions within the print job using said WYSIWYG display, wherein the user input can selectively define any portion of said print job as a said region with an independent-specified print quality level, said regions including or excluding any particular element or elements of said print job as desired by the user.

2. The printer driver of claim 1, wherein said user input routine is configured to receive user input specifying a particular print quality level for each of said one or more regions defined within said print job.

3. The printer driver of claim 1, wherein said user input routine is configured to receive user input through a mouse connected to a host computer on which said printer driver is running.

4. The printer driver of claim 3, wherein said user input routine is configured to display movement of a cursor on said WYSIWYG display in response to physical movement of said mouse, said movement of said cursor being used by said user input routine to define said one or more regions within said print job.

5. The printer driver of claim 1, wherein a said print quality level is defined by pixels per unit distance.

6. The printer driver of claim 1, wherein said print job formatting routine prompts a user to input a print quality level setting for at least one of said regions.

7. A method of printing documents comprising printing designated regions within a print job at different print quality levels, said method
    further comprising:
    displaying a WYSIWYG display of said print job; and
    receiving user input defining one or more of said regions within said print job using said WYSIWYG display, wherein said user input can selectively define any portion of said print job as a said region with an independently-specified print quality level, said regions including or excluding any particular element or elements of said print job as desired by a user.

8. The method of claim 7, further comprising specifying said one or more regions within said print job by moving a cursor driven by a mouse over said WYSIWYG display.

9. The method of claim 7, wherein a said print quality level is defined by pixels per unit distance.

10. The printer driver of claim 7, further comprising prompting a user to input settings for said print quality levels corresponding to said regions.

11. A computer system comprising:
    a host computer;
    an interface on said host computer for connecting a printing device to said host computer; and
    a printer driver stored on said host computer for formatting print job data from said host computer to a printing device;
    wherein said printer driver comprises a print job formatting routine which notes one or more regions within a print job derived from print job data and further specifies a particular print quality level at which each such region is to be printed; and
    wherein said print driver further comprises:
    a WYSIWYG display routine for generating a WYSIWYG display of a print job; and
    a user input routine for receiving user input defining said one or more regions within a print job using said WYSIWYG display, wherein said user input can selectively define any portion of said print job as a said region with an independently-specified print quality level, said regions including or excluding any particular element or elements of said print job as desired by a user.

12. The system of claim 11, wherein said user input routine is configured to receive user input specifying a particular print quality level for each of said one or more regions defined within said print job.

13. The system of claim 11, wherein a said print quality level is defined by pixels per unit distance.

14. The system of claim 11, wherein said print job formatting routine prompts a user to input a print quality level setting for at least one of said regions.

15. A printer driver stored on a computer-readable medium comprising:
   an interface configured to receive print job data;
   a user interface with which a user designates one or more specific regions of a print job represented by said print job data; and
   a print job formatting routine which notes said one or more regions within said print job and further specifies a particular print quality level at which each such region is then printed,
   wherein user input through said user interface can selectively define any portion of said print job as a said region with an independently-specified print quality level, said regions including or excluding any particular element or elements of said print job as desired by a user.

16. The printer driver of claim 15, wherein said user interface comprises a WYSIWYG display of said print job.

17. The printer driver of claim 15, wherein said user interface comprises a mouse moving a cursor on a display of said print job, wherein clicking and dragging said cursor on said display designates a said region of said print job.

18. The printer driver of claim 15, wherein said print quality level is defined by pixels per unit distance.

19. A printer driver stored on a non-transitory computer-readable medium comprising:
   an interface configured to receive print job data;
   a print job formatting routine which notes said one or more regions within said print job derived from said print job and further specifies a particular print quality level at which each such region is then printed;
   a display routine for generating a display of said print job; and
   a user input routine for receiving user input defining said one or more regions within said print job using said display, wherein user input can selectively define any portion of said print job as a said region with an independent-specified print quality level, said regions including or excluding any particular element or elements of said print job as desired by a user.

20. A method of printing documents comprising printing designated regions within a print job at different print quality levels, said method
   further comprising:
   displaying a display of said print job; and
   receiving user input defining one or more of said regions within said print job using said display, wherein said user input can selectively define any portion of said print job as a said region with an independently-specified print quality level, said regions including or excluding any particular element or elements of said print job as desired by a user.

* * * * *

UNITED STATES PATENT AND TRADEMARK OFFICE
CERTIFICATE OF CORRECTION

| | |
|---|---|
| PATENT NO. | : 7,941,750 B2 |
| APPLICATION NO. | : 09/976302 |
| DATED | : May 10, 2011 |
| INVENTOR(S) | : John David Laughlin |

It is certified that error appears in the above-identified patent and that said Letters Patent is hereby corrected as shown below:

In column 10, line 7, in Claim 19, after "from said" delete "print job" and insert -- print job data --, therefor.

Signed and Sealed this
First Day of November, 2011

David J. Kappos
*Director of the United States Patent and Trademark Office*